US008568592B2

(12) United States Patent
Coleman

(10) Patent No.: US 8,568,592 B2
(45) Date of Patent: Oct. 29, 2013

(54) METHOD OF BIOLOGICAL PHOSPHORUS REMOVAL WITH MAXIMUM NITROGEN REMOVAL IN WASTEWATER

(75) Inventor: Thomas E. Coleman, Yakima, WA (US)

(73) Assignee: dTEC Systems LLC, Seattle, WA (US)

( * ) Notice: Subject to any disclaimer, the term of this patent is extended or adjusted under 35 U.S.C. 154(b) by 0 days.

(21) Appl. No.: 12/929,314

(22) Filed: Jan. 13, 2011

(65) Prior Publication Data
US 2012/0187042 A1 Jul. 26, 2012

Related U.S. Application Data

(60) Provisional application No. 61/282,280, filed on Jan. 13, 2010.

(51) Int. Cl.
*C02F 3/30* (2006.01)
(52) U.S. Cl.
USPC ............ 210/605; 210/614; 210/903; 210/906
(58) Field of Classification Search
USPC .................. 210/605, 614, 623, 630, 903, 906
See application file for complete search history.

(56) References Cited

U.S. PATENT DOCUMENTS

| | | | |
|---|---|---|---|
| 2,875,151 A | 2/1959 | Davidson | |
| 4,056,465 A | 11/1977 | Spector | |
| 4,162,153 A | 7/1979 | Spector | |
| 4,285,818 A | 8/1981 | Muskat | |
| 4,460,471 A | 7/1984 | Reid | |
| 4,663,044 A | 5/1987 | Goronszy | |
| 4,975,197 A | 12/1990 | Wittmann et al. | |
| 5,252,214 A * | 10/1993 | Lorenz et al. | 210/605 |
| 5,582,734 A | 12/1996 | Coleman | |
| 2007/0193949 A1 * | 8/2007 | You et al. | 210/605 |

FOREIGN PATENT DOCUMENTS

WO WO 81/00708 A1 * 3/1981

OTHER PUBLICATIONS

Yuan et al, "Selection and Enrichment of Denitrifying Phosphorus Accumulating Organisms in Activated Sludge" WEFTEC 2009 4330-4341.
Yuan et al, "Sludge Population Optimisation: a new dimension for the control of biological wastewater", Water Research 36(2002) 482-490.
Potter et al, "Optimization of Periodic Biological Process for Nitrogen Removal from Wastewater", Water Research 30 (1996) 142-152.
Daims et al, "Waste Water Treatment: a model system tor microbial ecology", Trends in Biotechnology, vol. 24, No. 11, 483-489, 2006.
Martin et al, "Metagenomic analysis of two enhanced biological phosphorus removal sludge communities", Nature Biotechnology, 24 (10), 1263-1269 2006.

(Continued)

*Primary Examiner* — Fred Prince

(57) ABSTRACT

A method for removing phosphorus and nitrogen from an activated sludge wastewater treatment system is provided consisting of one or more anaerobic zones followed by two or more activated sludge reactors operating in parallel each having independent aeration/mixing means, whereby the utilization of the influent organic carbon under anoxic conditions; and thereby, the selection of denitrifying phosphate accumulating organisms (DNPAOs) over non-denitrifying phosphate accumulating organisms (PAOs), is maximized in order to further maximize the removal of phosphorus and nitrogen in the wastewater treatment system.

2 Claims, 6 Drawing Sheets

Diurnal Curve Showing Initial Anoxic Cycle Start Times

(56) References Cited

OTHER PUBLICATIONS

Kuba et al, "Phosphorus and Nitrogen removal with minimal COD requirement by integration of denitrifying dephosphatation and nitrification", Wat. Res. 30 (7) 1702-1710 1996.

Murnleitner et al, "Integrated Metabolic Model for the aerobic and denitrifying biological phosphorus removal", Biotech and Bioengineering, 54 (5), 434-450, 1997.

McMahon et al, "Polyphosphate kinase genes from full-scale activated sludge plants", Appl. Microbiol. Biotechnol. 77:167-173 (2007).

He et al, "Candidatus Accumulibacter population structure in enhanced biological phosphorus removal sludges", Applied and Environmental Microbiology, Sep. 2007, 5865-5874.

Wagner et al, "Microbial community composition and function in wastewater treatment plants", Antonie van Leeuwenhoek, 81:665-680, 2002.

* cited by examiner

Biological Phosphorus Removal Process

UCT Process Flow Schematic

Flow Schematic for an Anaerobic/SNdN

Graph of ORP vs. Time When Cycling Between Aerobic and Anoxic Conditions

BNR Example with Three parallel Oxic/Anoxic Basins

Diurnal Curve Showing Initial Anoxic Cycle Start Times

METHOD OF BIOLOGICAL PHOSPHORUS REMOVAL WITH MAXIMUM NITROGEN REMOVAL IN WASTEWATER

PRIORITY CLAIM

This application claims priority pursuant to 35 USC 119(e) based on U.S. provisional Application No. 61/282,280, filed Jan. 13, 2011, the entire contents of which are herein incorporated by reference.

BACKGROUND OF THE PRESENT INVENTION

The present invention is directed to a low cost process control system that will improve the reliability and performance of municipal and industrial wastewater treatment plants which are designed to remove phosphorus and nitrogen. The invention will serve as an enabling technology allowing engineers to better exploit the power of biotechnology to protect the environment and to significantly reduce the amount of energy consumed in removing nutrients from wastewater discharges.

Human activities can accelerate the rate at which nutrients enter ecosystems. Phosphorus (P) is often the limiting nutrient in cases of eutrophication in lakes and rivers subjected to runoff and/or point source pollution from wastewater treatment plants (Carpenter, Stephen R., "Phosphorus control is critical to mitigating eutrophication", *Proc Natl Acad Sci U.S.A.*; Vol 105(32): 11039-11040 Aug. 12, 2008). At the same time, phosphate rock from which P fertilizers are produced is a non-renewable resource which is being rapidly depleted (Gilbert, N., "The disappearing nutrient", *Nature*, Vol. 461, p. 719, October 2009). More effective process control systems will help to promote the maximum use of biological P (Bio-P) removal where chemical precipitation for P removal might otherwise be used. This is also important because P can be recovered as a by-product of Bio-P removal systems for beneficial use as fertilizer (Kresge, R., D. Barbeau, R. Bishop, K. Bowers, W. Leaf, and M. Murray, "Phosphorus Recycling for a Sustainable Future", *WEFTEC Proceedings*, Orlando, Fla., October 2009), while P from chemical precipitates removed using metal salts cannot be effectively recovered for beneficial use.

Worldwide, biological treatment of municipal and industrial wastewater is one of the most important uses of biotechnology (Wagner, M.; Loy, A.; Nogueira, R.; Purkhold, U.; Lee, N.; Daims, H. "Microbial community compostition and function in wastewater treatment plants", *Antonie van Leeuwenhoek* 2002, 81, 665-680). Although biological wastewater treatment has been used for more than a century, until recently, research on the microbiology of these treatment processes suffered from severe methodological limitations (Wagner, M.; Amann, R.; Lemmer, H.; Schleifer, K-H., "Probing activated sludge with oligonucleotides specific for proteobacteria: inadequacy of culture-dependent methods for describing microbial community structure", *Appl. Environ. Microbiol.* 1993, 59, 1520-1525). With the introduction of several different molecular techniques in wastewater microbiology (Wagner, M.; Erhart, R.; Manz, W.; Amann, R.; Lemmer, H.; Wedi, D.; Schleifer, K-H. "Development of an rRNA-targeted oligonucleotide probe specific for the genus", "*Acinetobacter* and its application for in situ monitoring in activated sludge", *Appl. Environ. Microbiol.* 1994, 60, 792-800; Bond, P. L.; Hugenholtz, P.; Keller, J.; Blackall, L. L. "Bacterial community structures of phosphate-removing and nonphosphate-removing activated sludges from sequencing batch reactors, *Appl. Environ. Microbiol.* 1995, 61, 1910-1916; Schramm, A.; Larsen, L. H.; Revsbech, N. P.; Ramsing, N. B.; Amann, R.; Schleifer, K-H. "Structure and function of a nitrifying biofilm as determined by in situ hybridization and the use of microelectrodes", *Appl. Environ. Microbiol.* 1996, 62, 4641-4647; Snaidr, J.; Amann, R.; Huber, I.; Ludwig, W.; Schleifer, K-H. "Phylogenetic analysis and in situ identification of bacteria in activated sludge", *Appl. Environ. Microbiol.* 1997, 63, 2884-2896; Juretschko, S.; Timmermann, G.; Schmid, M.; Schleifer, K. H.; Pommerening-Roser, A.; Koops, H. P.; Wagner, M. "Combined molecular and conventional analyses of nitrifying bacterium diversity in activated sludge: *Nitrosococcus mobilis* and *Nitrospira*-like bacteria as dominant populations", *Appl. Environ. Microbiol.* 1998, 64, 3042-3051; Lee, N.; Nielsen, P. H.; Andreasen, K. H.; Juretschko, S.; Nielsen, J. L.; Schleifer, K-H.; Wagner, M. "Combination of fluorescent in situ hybridization and microautoradiography—a new tool for structure-function analyses in microbial ecology", *Appl. Environ. Microbiol.* 1999, 65, 1289-1297; Purkhold, U.; Pommering-Röser, A.; Juretschko, S.; Schmid, M. C.; Koops, H-P.; Wagner, M. "Phylogeny of all recognized species of ammonia oxidizers based on comparative 16S rRNA and amoA sequence analysis: implications for molecular diversity surveys", *Appl. Environ. Microbiol.* 2000, 66, 5368-5382), it has become possible to determine the composition and dynamics of microbial communities in these systems and to identify the specific organisms which predominate in the different process reactor environments. One of the molecular detection methods commonly employed is the fluorescent in situ hybridization technique (FISH) targeting the 16S ribosomal RNA (rRNA) using oligonucleotide probes (short sequences of nucleic acids). More recently, DNA and RNA oligonucleotide microarrays (El Fantroussi, S.; Urakawa, H.; Bernhard, A. E.; Kelly, J. J.; Noble, P. A.; Smidt, H.; Yershov, G. M.; Stahl, D. A. "Direct profiling of environmental microbial populations by thermal dissociation analysis of native rRNAs hybridized to oligoneucleotide microarrays", *Appl. Environ. Microbiol.* 2003, 69, 2377-2382; and Kelly, J. J.; Siripong, S.; McCormack, J.; Janus, L. R.; Urakawa, H.; El Fantroussi, S.; Noble, P. A.; Sappelsa, L.; Rittmann, B. E.; Stahl, D. A. "DNA microarray detection of nitrifying bacterial 16S rRNA in wastewater treatment plant samples", *Water Research* 2005, 39, 3229-3238) and quantitative polymerase chain reaction (qPCR) targeting 16S rRNA and the polyphosphate kinase 1 gene from environmental microbial populations have been used. (He, Shaomei, Daniel L. Gall, and Katherine D. McMahon, ""*Candidatus* Accumulibacter" Population Structure in Enhanced Biological Phosphorus Removal Sludges as Revealed by Polyphosphate Kinase Genes", *Appl Environ Microbiol.* Vol. 73(18): 5865-5874, 2007; McMahon, K. D., S. Yilmaz, S. He, D. L. Gall, D. Jenkins, and J. D. Keasling, "Polyphosphate kinase genes from full-scale activated sludge plants", *Appl. Microbiol. Biotechnol.*, Vol. 77 p. 167, August 2007).

Considerable efforts have been made over the years to develop improved on-line monitoring and control systems for wastewater treatment processes. However, until now the process control variables used in these systems have been based primarily on the measurement of physical and chemical parameters. As an example, dissolved oxygen (DO) sensors are widely employed to control aeration rates in activated sludge reactor basins. A control loop is used to maintain a desired DO set point by modulating the aeration input. Other chemical parameters which are often monitored in wastewater treatment systems include; ammonium ($NH_4^+$), nitrate ($NO_3^-$), nitrite ($NO_2^-$), and phosphate ($PO_4^{-3}$) ions. These parameters are principally used as indicators of overall treatment plant performance, and only infrequently and indirectly have they been used as on-line control process variables.

There is substantial and mounting evidence suggesting how the microbial community structure and their properties might be affected by the operation and control strategies which are employed in different wastewater treatment facilities (Yuan, Z. G.; Blackall, L. L. "Sludge population optimisation: a new dimension for the control of biological wastewater treatment systems", *Water Research* 2002, 36, 482-490). However, the impact of these control actions on the microbial community in the system and on the specific organisms which are likely to predominant under a given set of operational conditions have not been explicitly taken into consideration until very recently (Yuan, Z.; Peng, Y.; Oehmen, A.; Huabing, L.; Fux, C.; Keller, J. "Sludge population optimisation in biological wastewater treatment systems through on-line process control: What can we achieve?" *Proceedings of the 2nd IWA Conference on Instrumentation, Control and Automation*. Busan, Korea, May 29-Jun. 2, 2005). Better integration of knowledge and tools between the disciplines of engineering and microbial biology is urgently needed to realize, fully, the great potential of environmental biotechnology (Daims, Holger, Michael W. Taylor and Michael Wagner "Wastewater treatment: a model system for microbial ecology", *TRENDS in Biotechnology* Vol. 24 No. 11, 2006). Accomplishing this integration will require a systematic study on the effects of process design, operation and control on the microbial population dynamics in full-scale biological nutrient removal (BNR) treatment facilities using molecular biological methods. In this respect, wastewater treatment plants (WWTPs) create a significant opportunity for the needed cooperation between engineers and microbiologists in carrying out these studies. The present invention will make an important contribution to this effort which will also lead to important commercial applications, as well as broad societal benefits.

It is becoming increasingly common for regulatory agencies to impose limits on phosphorus as well as nitrogen on discharges from wastewater treatment plants (U.S. EPA 2009). The biological removal of both nutrients is more complex since the efficiency of both processes is dependent, in part, on the available organic carbon (C) substrate in the influent wastewater or from an external source, when necessary. Based on the knowledge which can be gained using the molecular detection tools described above to characterize and monitor the microbial communities in full-scaled wastewater treatment plants, the present invention will maximize biological phosphorus removal while at the same time achieving the maximum biological nitrogen removal which can be obtained with the available carbon in the influent wastewater. The system could be readily implemented in both new and existing treatment facilities.

The broader societal benefits will include: decreasing the environmental impact of humans on the planet and recovery of non-renewable natural resources, as noted above; significant educational opportunities; contributions to the scientific literature in this field; and the stimulation of technology transfer from molecular biologists to engineering professionals and wastewater treatment facility operating personnel.

In a conventional BNR wastewater treatment plant, nitrogen removal is achieved through nitrification and denitrification. Nitrification is the oxidation of ammonium to nitrate, catalyzed by bacteria, and is a key part of global nitrogen cycling (Prosser, J. I. "Autotrophic nitrification in bacteria", *Adv. Microb. Physiol.* 1989, 30, 125-181). In the first step of nitrification, chemolithoautotrophic ammonia oxidizing bacteria (AOB) transform ammonium to nitrite. Nitrite is subsequently oxidized to nitrate by the nitrite-oxidizing bacteria (NOB) (Bock, E.; Koops, H-P.; Ahlers, B.; Harms, H. *Oxidation of inorganic nitrogen compounds as energy source*, p. 414-430. In Balows, A.; Truëper, H. G.; Dworkin, M.; Harder, W.; Schleifer, K-H.; *The prokaryotes*. 2nd ed.; Springer Verlag, New York, N.Y., 1992.). Data from 16S rRNA catalogs (Woese, C. R.; Weisburg, W. G.; Paster, B. J.; Hahn, C. M.; Tanner, R. S.; Krieg, N. R.; Koops, H. P.; Harms, H.; Stackebrandt, E. "The Phylogeny of the Purple Bacteria: The Beta Subdivision", *Systematic and Applied Microbiology* 1984, 5, 327-336; Woese, C. R.; Weisburg, W. G.; Hahn, C. M.; Paster, B. J.; Zablen, L. B.; Lewis, B. J.; Macke, T. J.; Ludwig, W.; Stackebrandt, E. "The Phylogeny of the Purple Bacteria: The Gamma Subdivision", *Systematic Applied Microbiology* 1985, 6, 25-33) first demonstrated that there are two phylogenetically distinct groups of autotrophic AOBs. One of these contained *Nitrosococcus oceanus*, and was within the gamma-subdivision of the Proteobacteria. The AOB in the beta-subdivision formed two deep branches; *Nitrosomonas* and *Nitrosospira* (Head, I. M.; Hiorns, W. D.; Embley, T. M.; McCarthy, A. J.; Saunders, R. "The Phylogeny of Autotrophic Ammonia-Oxidizing Bacteria as Determined by Analysis of 16S Ribosomal RNA Gene Sequences", *Journal of General Microbiology* 1993, 139, 1147-1153). All isolated chemolithoautotrophic, nitriteoxidizing bacteria belong to one of four different genera; *Nitrobacter* (alpha subclass of *Proteobacteria*), *Nitrococcus* (gamma subclass of *Proteobacteria*), *Nitrospina* (delta sub-class of *Proteobacteria*), and *Nitrospira* (phylum *Nitrospira*) (Bock, E.; Koops, H-P. *The genus Nitrobacter and related genera*. p. 2302-2309. In Balows, A.; Truëper, H. G.; Dworkin, M.; Harder, W.; Schleifer, K.-H. *The prokaryotes*, 2nd ed.; Springer Verlag, New York, N.Y., 1992).

It had long been assumed that *Nitrosomonas* spp., were responsible for oxidizing ammonium to nitrite (Equation 1) and that *Nitrobacter* spp., were responsible for oxidizing nitrite to nitrate (Equation 2) (Randall, C. W.; Barnard, J. L.; Stensel, H. D. *Design and Retrofit of Wastewater Treatment Plants for Biological Nutrient Removal*. Vol. 5, Technomic Publishing Co., Lancaster, Pa., 1992; Bever, J.; Stein, A.; Teichmann, H. (ed.). *Weitergehende Abwasserreinigung*. R. Oldenbourg Verlag, Munich, Germany, 1995; Henze, M.; Harremoës, P.; Jansen, J.; Arvin, E.; *Wastewater treatment*. 2nd ed.; Springer-Verlag, Berlin, Germany, 1997):

$$2NH_4^+ + 3O_2 \rightarrow 2NO_2^- + 4H^+ + 2H_2O \quad \text{Equation 1}$$

$$2NO_2^- + O_2 \rightarrow 2NO_3^- \quad \text{Equation 2}$$

However, in contrast to this "textbook" knowledge, *Nitrospira*-like bacteria, not *Nitrobacter* spp., have been observed to be the dominant nitrite oxidizers, both in most full-scale wastewater treatment plants and in laboratory scale reactors (Juretschko, S.; Timmerman, G.; Schmid, M.; Schleifer, K. H.; Pommerening-Roser, A.; Koops, H. P.; Wagner, M. "Combined molecular and conventional analysis of nitrifying bacterium diversity in activated sludge: *Nitrosococcus mobilis* and *Nitrospra*-like bacteria as dominate populations", *Appl. Environ*. Microbiol. 1998, 64, 3042-3051; Okabe, S.; Satoh, H.; Watanabe, Y. "In situ analysis of nitrifying biofilms as determined by in situ hybridization and the use of microelectrodes", *Appl. Environ. Microbiol.* 1999, 65, 3182-3191; Schramm, A.; de Beer, D.; Wagner, M.; Amann R. "Identification and activities in situ of *Nitrosospira* and *Nitrospira* spp. as dominant populations in a nitrifying fluidized bed reactor", *Appl. Environ. Microbiol.* 1998, 64, 3480-3485; Wagner, M.; Rath, G.; Koops, H-P.; Flood, J.; Amann, R. "In situ analysis of nitrifying bacteria in sewage treatment plants", *Water Sci. Technol.* 1996, 34, 237-244). Based on fluorescence in situ hybridization combined with microelectrode measurements, it has been suggested that *Nitrospira*-like nitrite oxidizers represent K strategists adapted to low nitrite and oxygen concentrations, while *Nitrobacter* spp., is an r strategist which thrives if nitrite and oxygen are present in higher concentrations (Schramm, A.; de Beer, D.; van den Heuvel, J. C.; Ottengraf, S.; Amann, R. "Microscale distribution of populations and activities of *Nitrosospira* and *Nitrospira* spp. along a macroscale gradient in a nitrifying bioreactor: quantification by in situ hybridization and the use of microsensors", *Appl. Environ. Microbiol.* 1999, 65, 3690-3696). Likewise, it has been observed in some wastewater treatment plants that the *Nitrosospira* genus was the dominant AOB rather than *Nitrosomonas* (Coskuner, G.; Curtis, T. P. "In situ characterization of nitrifiers in an activated sludge plant: detection of *Nitrobacter* Spp", *J. Applied Microbiology* 2002, 93, 431-437).

Although organic carbon is not required for nitrifying bacteria to complete nitrification, sufficient organic carbon in the form of readily biodegradable chemical oxygen demand (rbCOD) is necessary for denitrifying bacteria to carry out denitrification. To achieve enhanced biological phosphorus removal (EBPR) as depicted in FIG. 1, it is necessary to provide the phosphorus accumulating organisms (PAO) with adequate supply of rbCOD in form of volatile fatty acids (VFA) and appropriate anaerobic conditions free of nitrates. Thus, there is a competition for the available rbCOD between PAOs and denitrifying bacteria. When influent wastewater is weak or dilute, external carbon needs to be added. In order to solve the problem of competition for the limited organic substrate, denitrifying phosphorus accumulating organisms (DNPAO) have received considerable attention (Kuba, T., van Loosdrecht, M. C. M, & Heijnen, J. J. "Phosphorus and nitrogen removal with minimal COD requirement by integration of denitrifying dephosphatation and nitrification in a two-sludge system", *Water Res.* 30 (7) 1702-1710, 1996; Spagni, A., Stante, L. & Bortone G., "Selection of denitrifying phosphorus accumulating organisms in activated sludge", *Env. Technol.* 22 (12), 1429-1437, 2001; Ahn, J., Daidou, T., Tsuneda, S. & Hirata, A. "Selection and dominance mechanisms of denitrifying phosphate-accumulating organisms in biological phosphate removal", *Biotechnol. Letters.* 23, 2005-2008, 2001; Shoji, T., Satoh, H. & Mino, T. "Quantitative estimation of the role of denitrifying phosphate accumulating organisms in nutrient removal", *Water Sci. Technol.* 47 (11) 23-29, 2003).

DNPAO are distinguished from aerobic PAO by their unique metabolic characteristic (Murnleitner, E., Kuba, T., van Loosdrecht, M. C. M, & Heijnen, J. J. "An integrated metabolic model for the aerobic and denitrifying biological phosphorus removal", *Biotechnol. Bioeng.* 54 (5) 434-450, 1997). The mechanism of anaerobic phosphate release of DNPAO is the same as that of aerobic PAO. As depicted in FIG. 1, external organic substrate is taken up and converted to polyhydroxyalkanoate as a cell energy source (The Figure shows PHB, or polyhydroxybutyrate as the cellular storage polymer). However, the manner of phosphate uptake is different between the two types of PAOs. Aerobic PAOs can only use oxygen as an electron acceptor for cell respiration which promotes phosphorus removal; whereas DNPAO can use nitrite or nitrate as an electron acceptor instead of oxygen (Meinhold, J., Arnold, E. and Isaacs, S., "Effect of nitrite on anoxic phosphate uptake in biological phosphorus removal activated sludge", *Water Res.* 33, 1871-1883, 1999). In this way, DNPAO can combine phosphorus removal and denitrification into one process using the same amount of organic carbon substrate. In addition, less aeration is needed which translates into lower energy requirement. Kuba et al. ("Phosphorus and nitrogen removal with minimal COD requirement by integration of denitrifying dephosphatation and nitrification in a two-sludge system", *Water Res.* 30(7) 1702-1710, 1996) showed that DNPAO can reduce sludge generation by 30%, due to their low cell yield. Thus, the advantage of selecting for DNPAOs over PAOs by means of reactor configuration and/or control strategies is very significant. Therefore, selection and enrichment of DNPAO is a key factor in optimizing EBPR and biological nitrogen removal and this is one of the objectives of the present invention.

Although denitrifying phosphate uptake was reported earlier by Gerber (Gerber, A., de Villiers, H., Mostert, E. S. & van Riet, C. J. "The phenomenon of simultaneous phosphate uptake and release, and its importance in biological nutrient removal. In: Biological Phosphate Removal from Wastewater", *Advances in Water Pollution Control* No. 2; R. Ramadori (ed.). Pergamon Press, Oxford, pp. 123-134, 1987) and Comeau, Y., Oldham, W. K. & Hall, K. J. "Dynamicas of carbon reserves in biological dephosphatation of wastewater. In: Biological Phosphate Removal from Wastewater", *Advances in Water Pollution Control No.* 2. R. Ramadori (ed.). Pergamon Press, Oxford, pp. 39-55, 1987, DNPAO did not receive a great deal of attention until Kerrn-Jespersen, J. P. & Henze, M., "Biological phosphorus uptake under anoxic and aerobic conditions", *Water Res.* 27, 617-624, 1993, Henze, M.; Harremoes, P.; Jansen J.; Arvin, E, *Wastewater Treatment* $2^{nd}$ ed., Springer-Verlag, Berlin, Germany (1997) distinguished them from aerobic PAO.

Later research focused more on DNPAO metabolic characteristics and biochemical mechanisms (Kuba, T., Smolders, G., van Loosdrecht, M. C. M, & Heijnen, J. J., "Biological phosphorus removal from wastewater by anaerobic-anoxic sequencing batch reactor", *Water Sci. Tech.* 27 (5-6), 241-252, 1993; Sorm, R., Wanner, J. Saltarelli, R., Bortone, G. & Tilche, A., "Verification of anoxic phosphate uptake as the main biochemical mechanism of the "Dephanox" process", *Water Sci. Tech.* 35 (10), 87-94, 1997. Chung, J. Kim, Y., Lee, D. Shim, H. & Kim, J., "Characteristics of denitrifying phosphate accumulating organisms in anaerobic-intermittently aerobic process", *Environ. Eng. Sci.* 23 (6) 981-993, 2006). However, little attention was paid to its selection and enrichment. More recently, Yuan and Oleszkiewicz ("Selection and Enrichment of Denitrifying Phosphorus Accumulating Organisms in Activated Sludge", *WEFTEC Proceedings*, Orlando, Fla., October 2009) observed a community shift favoring DNPAOs over PAOs in laboratory scale sequencing batch reactors (SBRs) by extending the anoxic period and increasing nitrate dosage.

The basic engineering principles for the design of P and N removal treatment facilities have been well established and have been implemented in a number of configurations including the UCT process, the Bardenpho process, $A_2O$, and others. The UCT Process flow configuration is shown in FIG. 2. All of these processes include an anaerobic zone, followed by one or more anoxic zones and one or more aerobic zones. The only systems that would not include an anoxic zone would be those that are not required to and do not nitrify. For all others, it is imperative that any return activated sludge or mixed liquor be denitrified before being returned to the anaerobic zone.

When nitrate or oxygen is discharged to the anaerobic zone, two things may happen, both undesirable:

They will prevent fermentation of rbCOD to acetic and propionic acid; and

Nitrates or DO could serve as electron acceptors for PAOs and other organisms that will metabolize the VFA and so deprive the PAOs of the substance that they need to store for growth and phosphorus removal.

Therefore, the UCT and other similar processes utilize internal recycle streams such that minimal nitrate or DO is returned to the anaerobic zone. These pumped recycle stream flow rates must be carefully regulated to assure that the desired process objectives are achieved. These types of BNR facilities are more complex than conventional activated sludge plants in terms of operation and control and are more expensive to construct, operate, and maintain. Because of the added cost and complexity of multi-stage BNR systems, many WWTPs, particularly smaller plants less than 5 MGD, have up to now elected to utilize chemical precipitation instead when needed to meet permit requirements for phosphorus removal.

In recent years there has been a great deal of interest focused on treatment plant designs and control strategies which achieve simultaneous nitrification and denitrification (SNdN) in the same reactor instead of separate anoxic/aerobic reactors with internal recycle pumping. The typical approach to encourage SNdN is to limit the DO concentration to very low levels. Advantages which can be attributed to SNdN as compared to more conventional nitrogen removal processes include:
1. Reduced aeration demand for nitrification (lower energy consumption).
2. Internal recycle not required (lower capital costs, less energy, and simpler operation).
3. Reduced energy consumption due to improved oxygen transfer driving force at low DO set points.
4. Reduced carbon source requirements to drive denitrification of $NO_2^-$ instead of $NO_3^-$ if the system can be operated to inhibit the growth of NOBs. The effective inhibition of NOB has been referred to as the "nitrite shunt" (O'Neill, M.; Huren, N.J. "Achieving Simultaneous Nitrification and Denitrification of Wastewater at Reduced Costs", *Water Sci. Technol.* 1995, 32 (9-10), 303-312.

If an SNdN reactor were to follow an anaerobic zone as shown in FIG. 3, it might be possible to achieve P removal as well as N removal while realizing the benefits of SNdN listed above. However, it has been shown, that systems operated at very low DO levels as necessary for SNdN have poorer P removal performance than those operated at higher DO levels (Drury, Douglas D., William Shepherd and B. Narayanan, "Phophorus—How Low Can You Go?", *WEFTEC Proceedings*, 2005).

Another alternative for achieving nitrification and denitrification in a single reactor is to cycle the basin between oxic and anoxic conditions. It is possible to detect the depletion of nitrate in a cyclic aerobic/anoxic process by following the rate of change in the oxidation reduction potential in the mixed liquor (Stensel, H. D.; Coleman, T. E.; Fleischmann, D.; Denham, W. B. "Innovative Process Used to Upgrade Oxidation Ditch for Nitrogen Removal and SVI Control", *Proceedings of the Water Environment Federation Conference*, Orlando Fla., October, 1995; Coleman, T. E.; Stensel, H. D.; Fleischmann, D.; Denham, W. B. "Automated ORP control for aerobic/anoxic cycling in oxidation ditch treatment", *Proceedings of the Amer. Soc. Of Civil Engr. National Conference on Environ. Engr.*, Boulder Colo., Jul. 11, 1994.)). If aeration is turned off at a selected time, the ORP will fall rapidly at first and then more gradually until a second inflection point is reached at a much lower ORP value. This second inflection point indicates the depletion of nitrate. FIG. 4 is a typical graph of the ORP vs. time when this aerobic/anoxic cyclic process is implemented. An advantage of the oxic/anoxic cycling approach is that is would avoid long term low DO conditions which lead to reduced P uptake. It could also provide selective pressure favoring DNPAOs.

DETAILED DESCRIPTION OF THE PRESENT INVENTION

Figure 1:
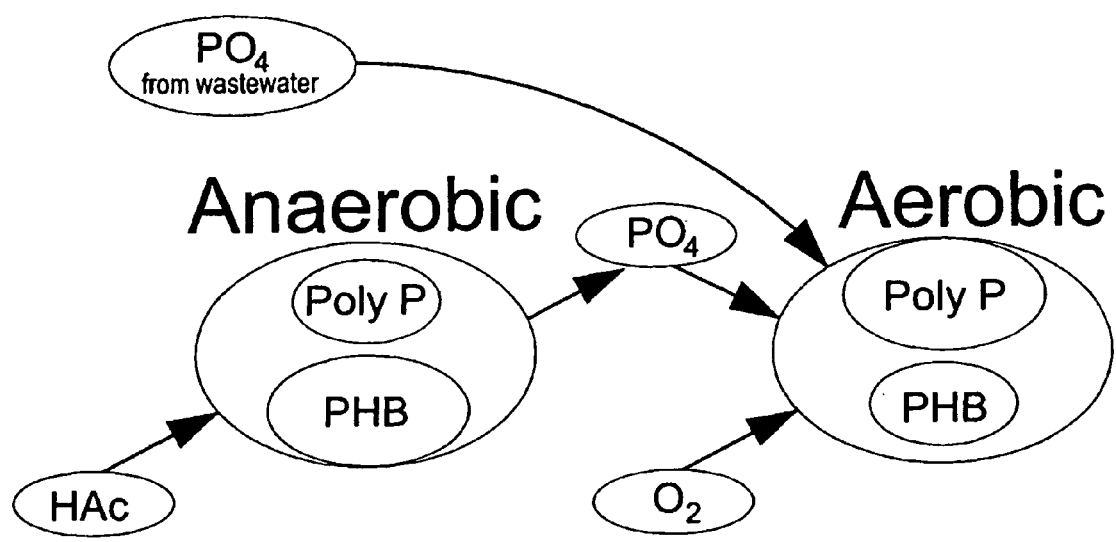
FIG. 1 is a diagram depicting the biological phosphorus removal process from EPA nutrient control design manual EPA/600/R-09/012, January 2009.
Figure 2:
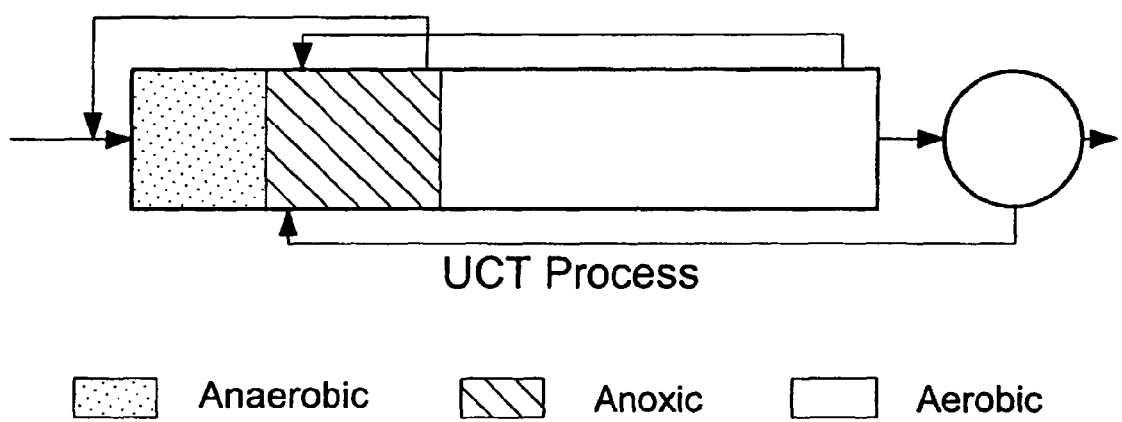
FIG. 2 is a flow schematic for a UCT process.
Figure 3:
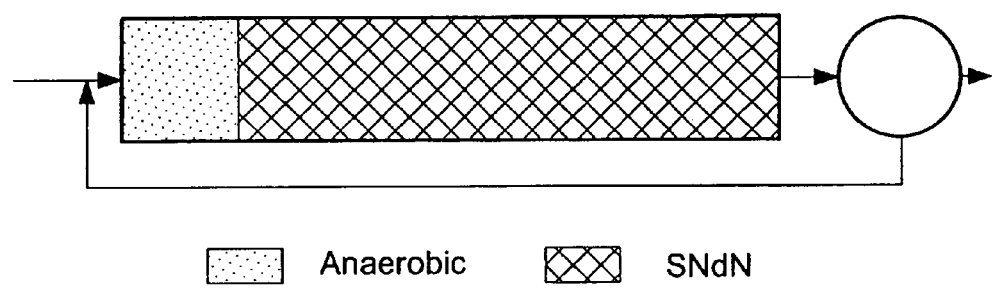
FIG. 3 is a flow schematic for an anaerobic/SNdN process configuration.
Figure 4:
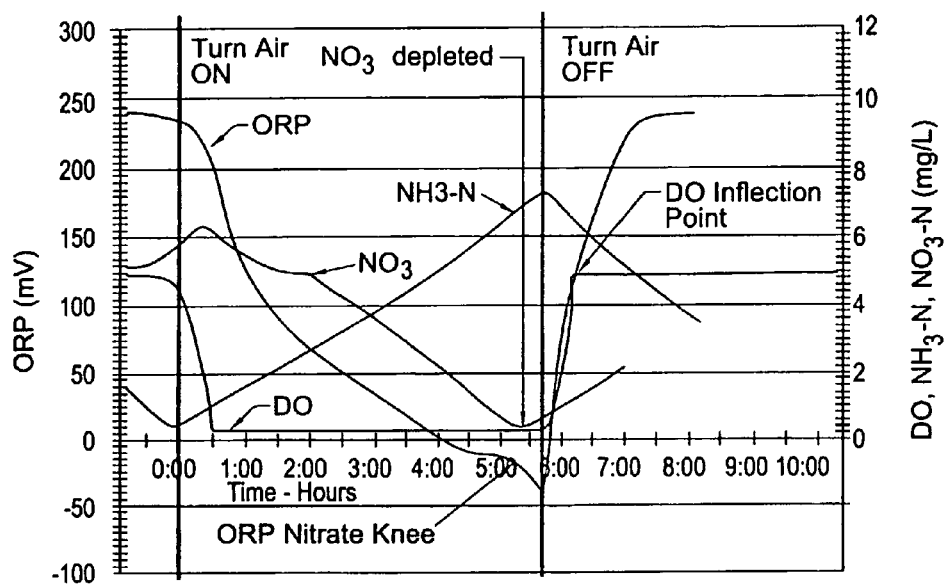
FIG. 4 is a typical graph of an ORP vs. time when cycling between aerobic and anoxic conditions.
Figure 5:
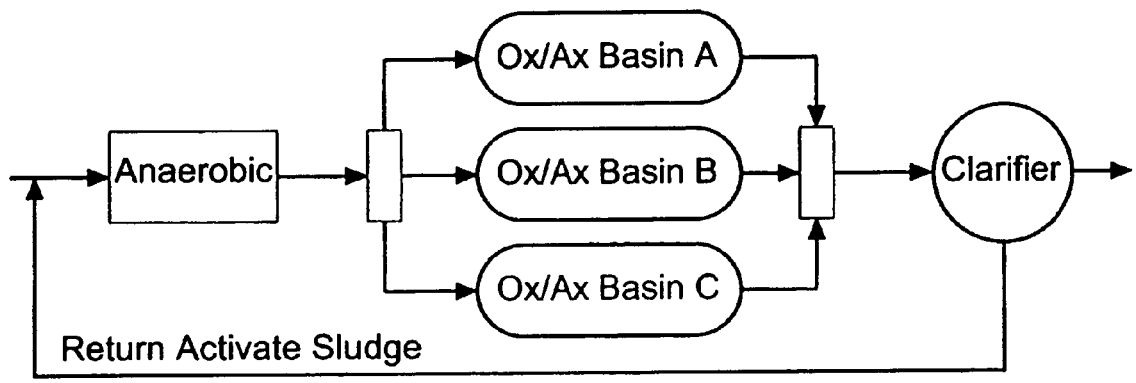
FIG. 5 is a BNR example using three parallel oxic/anoxic basins.

The innovative process control system of the present invention can be applied to BNR treatment process designs consisting of one or more anaerobic zones followed by at least two activated sludge reactors operating in parallel. The technical description of the innovation will be provided here by way of example, however, it should be noted that many other similar process configurations could be utilized in applying this technology. FIG. 5 shows a flow schematic with an anaerobic zone followed by three single stage Oxic/Anoxic reactors operating in parallel. Following the Oxic/Anoxic reactors would be one or more secondary clarifiers.

A key objective of the present invention is to provide a new innovative process control system designed to achieve the maximum enhanced biological phosphorus removal while at the same time maximizing energy efficient nitrogen removal. The control system of the present invention is based on a set of algorithms which form a logical model which will explicitly address the need for a process control automation strategy to affect long term population dynamics in the reactor as opposed to real time variable set points, such as dissolved oxygen.

Specific technical objectives for the present invention include the following:
1. Provide a microprocessor-based proprietary control system which maximizes EBPR while at the same time maximizing energy efficient nitrogen removal.
2. Demonstrate the effectiveness of the process control system in providing strong selective pressure favoring the growth of DNPAOs over PAOs which can only use oxygen.
3. Demonstrate the ability to select for AOB, NOB, and PAO bacterial species in the microbial community as a result of long term operation under the operational conditions described for the present invention.

Figure 6:
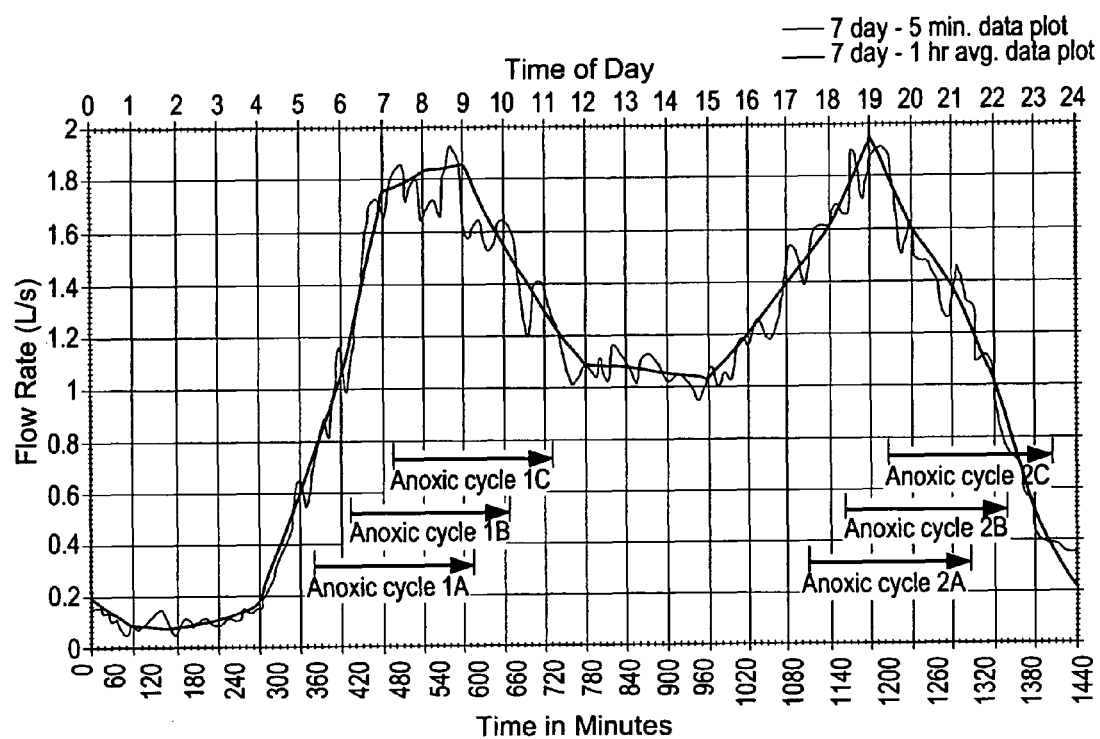
FIG. 6 is a typical graphical depiction showing initial anoxic cycle start times (2 cycles per ditch).

FIG. 6 shows a typical diurnal curve for a municipal wastewater treatment plant together with the initial start times for two anoxic cycles per day in each oxidation ditch. Note that the start times for Ditch B and Ditch C are offset from the start times of Ditch A. These offset times will be assigned variable names in the control system algorithm (e.g. $T_{OS-1B}$ and $T_{OS-1C}$) as will the initial start time of the first ditch to start in a cycle (e.g. $ST_{1A}$). Ditch A is the first in the sequence in this example, however, the assignment of the first ditch to start in the sequence is also a variable as discussed further below.

Once started, each anoxic cycle will continue until the available nitrate is depleted as determined by a control algorithm which detects the depletion of nitrate in the mixed liquor. The duration of each of the concurrent (but offset) cycles will be inversely proportional to the mass loading of organic carbon substrate in the influent during the corresponding period. The mass loading diurnal curve would generally follow the flow rate diurnal curve as depicted in FIG. 6, but could vary from this in some cases such as weekends and during special events which alter the normal diurnal variations in sewage flow.

The actual duration of each anoxic cycle will be stored in a circular array in the control system microprocessor memory. The size of the cycle duration array will be large enough to accommodate at least 60 days worth of data for each reactor. A comparison of the durations within each set of concurrent cycles will enable the control system to create an approximate mass loading diurnal curve in the vicinity of each set of concurrent anoxic cycles (two sets or series in the example shown here). A logic model will be developed using this information to continually adjust the initial anoxic series start time and the offsets for each of the concurrent cycles. It will also rotate the start sequence of Ditches A, B, and C (in the case of this example) and continually compare the durations of the other anoxic series (just one other series, in this example) and make appropriate adjustments to the duration between anoxic series start times. The objective of the model is to maximize the utilization of the influent organic carbon under anoxic conditions and to equalize, over a period of several mean cell residence times (MCRTs), the total anoxic time in each ditch normalized to mass loading. It is anticipated that the control system operating in this manner will provide strong selective pressure to favor the growth of DNPAO over PAO. As previously noted, this is an important factor in efficiently utilizing the available organic carbon to maximize both P removal and N removal, while at the same time achieving significant energy savings. Further energy savings will be realized as compared to the UCT and similar processes, since no internal recycle pumping is necessary. Bacterial species identification and quantification using q-PCR, is used to verify and optimize the process control logic model and control algorithms.

The need to achieve low levels of effluent P is becoming the key design criteria in many small and medium sized treatment facilities (U.S. EPA, 2009). The process control system of the present invention will maximize enhanced biological phosphorus while minimizing the potential for secondary phosphorus release in two ways: 1) the system will either be anoxic ($NO_3^-$ present), or it will be fully aerated, so that low DO periods where anaerobic conditions can exist within the floc will be minimized; and 2) the offset anoxic cycles will assure that low concentrations of $NO_3^-$ will always be present in the clarifier influent to limit the potential for secondary release in the sludge blanket.

What is claimed is:

1. A method for removing phosphorus and nitrogen from an activated sludge wastewater treatment system consisting of one or more anaerobic zones followed by two or more activated sludge reactors operating in parallel each having independent aeration/mixing means, said method comprising:

(1) anaerobically treating phosphorus and nitrogen-containing wastewater in at least one anaerobic treatment reactor;
(2) passing the effluent from the at least one anaerobic treatment reactor in substantially equal amounts to each of at least two aeration/mixing reactors wherein said effluent is aerated under mixing;
(3) ceasing said aeration in one of said aeration/mixing reactors for a non-aeration (anoxic) period, while maintaining said aeration/mixing in said other reactors;
(4) ceasing said aeration in a second reactor for a non-aeration (anoxic) period after a determined time delay increment;
(5) ceasing said aeration in each additional reactor in a sequenced manner for a non-aeration (anoxic) period, ceasing each after an initially specified time delay increment;
(6) continuing to mix said wastewater in each reactor during each said non-aeration (anoxic) period;
(7) ceasing said non-aeration (anoxic) period in each said reactor when the ORP (Oxygen-Reduction Potential) of said wastewater in said reactor has reached the ORP nitrate depletion inflection point;
(8) recording the duration of each non-aeration (anoxic) period;
(9) determining an approximate mass loading diurnal curve in the vicinity of each set of concurrent non-aeration (anoxic) cycles by comparing the durations of the anoxic periods within each set of concurrent cycles;
(10) rotating the start sequences of the reactors and the corresponding non-aeration periods and continually comparing the durations of the other non-aeration (anoxic) series occurring in each 24-hour period;
(11) whereby the utilization of the influent organic carbon under anoxic conditions, and thereby, the selection of denitrifying phosphate accumulating organisms (DNPAOs) over non-denitrifying phosphate accumulating organisms (PAOs) is maximized in order to further maximize the removal of phosphorus and nitrogen in the wastewater treatment system.

2. The method of claim 1, wherein a microprocessor-based monitoring and control system is utilized to:
(1) record the duration of each non-aeration (anoxic) period using a microprocessor based monitoring and control system;
(2) determine an approximate mass loading diurnal curve in the vicinity of each set of concurrent non-aeration (anoxic) cycles by comparing the durations of the anoxic periods within each set of concurrent cycles;
(3) rotate the start sequences for the reactors and the corresponding non-aeration periods and continually comparing the durations of the other non-aeration (anoxic) series occurring in each 24-hour period;
(4) maximize the utilization of the influent organic carbon under anoxic conditions, and thereby, maximizing the selection of denitrifying phosphate accumulating organisms (DNPAOs) over non-denitrifying phosphate accumulating organisms (PAOs) to maximize the removal of phosphorus and nitrogen in the wastewater treatment system.

* * * * *